(12) United States Patent
Song et al.

(10) Patent No.: US 8,606,330 B2
(45) Date of Patent: *Dec. 10, 2013

(54) METHOD OF DISPLAYING GEO-TAGGED IMAGES ON A MOBILE TERMINAL

(71) Applicant: LG Electronics, Seoul (KR)

(72) Inventors: Chi Won Song, Seoul (KR); Ji Youn Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,159

(22) Filed: Nov. 14, 2012

(65) Prior Publication Data

US 2013/0130746 A1 May 23, 2013

Related U.S. Application Data

(63) Continuation of application No. 12/830,248, filed on Jul. 2, 2010, now Pat. No. 8,340,695.

(30) Foreign Application Priority Data

Dec. 30, 2009 (KR) .......................... 10-2009-0134377

(51) Int. Cl.
*H04W 72/00* (2009.01)
*H04M 1/00* (2006.01)
*H04M 1/38* (2006.01)

(52) U.S. Cl.
USPC .......................... 455/566; 455/457; 455/550.1

(58) Field of Classification Search
USPC ................ 455/404.2, 414.1, 414.3, 418, 420,
455/422.1, 456.1–456.3, 456.5–456.6, 457,
455/466, 517, 550.1, 556.1–556.2,
455/557–558, 561, 566, 41.2–41.3;
701/212–213, 207–208, 454–455, 457,
701/461, 400–410, 425–426, 438, 446–448,
701/491; 382/103, 106, 164, 171;
715/758–763, 809–811, 841, 835–838;
348/14.01–14.04, 335.05, 335.12

See application file for complete search history.

(56) References Cited

U.S. PATENT DOCUMENTS

| | | | |
|---|---|---|---|
| 7,698,336 B2 * | 4/2010 | Nath | 707/737 |
| 8,000,726 B2 * | 8/2011 | Altman et al. | 455/456.3 |
| 8,340,695 B2 * | 12/2012 | Song et al. | 455/457 |
| 2007/0112729 A1 * | 5/2007 | Wiseman et al. | 707/3 |
| 2007/0258642 A1 * | 11/2007 | Thota | 382/173 |
| 2009/0110302 A1 * | 4/2009 | Snow | 382/225 |
| 2009/0280824 A1 * | 11/2009 | Rautiainen | 455/456.1 |
| 2010/0305844 A1 * | 12/2010 | Choi et al. | 701/201 |

* cited by examiner

*Primary Examiner* — Meless Zewdu
(74) *Attorney, Agent, or Firm* — Lee, Hong, Degerman, Kang & Waimey (57) ABSTRACT

A mobile terminal and a method of controlling the operation of the mobile terminal are provided. The method includes displaying a map, which is divided into a plurality of blocks in predetermined units of latitude and latitude, on a display module and displaying in each of the blocks identification information indicating whether a corresponding block includes geo-tagged information; and if one of the blocks is selected, displaying one or more thumbnail images corresponding to geo-tagged information included in the selected block on the display module. Therefore, it is possible to effectively select and use geo-tagged information even when using a small size screen.

18 Claims, 11 Drawing Sheets

METHOD OF DISPLAYING GEO-TAGGED IMAGES ON A MOBILE TERMINAL

CROSS-REFERENCE TO RELATED APPLICATIONS

This application is a continuation of U.S. application Ser. No. 12/830,248, filed on Jul. 2, 2010, now U.S. Pat. No. 8,340,695, which claims the benefit of earlier filing date and right of priority to Korean Patent Application No. 10-2009-0134377, filed on Dec. 30, 2009, the contents of which are all hereby incorporated by reference herein in their entirety.

BACKGROUND OF THE INVENTION

1. Field of the Invention

The present invention relates to a mobile terminal and a method of controlling the operation of the mobile terminal, and more particularly, to a mobile terminal capable of making an efficient use of geo-tagged information and a method of controlling the operation of the mobile terminal.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, double-sided liquid crystal displays (LCDs), or full touch screens have been employed in the manufacture of mobile terminals.

Most mobile terminals equipped with global positioning system (GPS) and camera features can add geographical identification information (such as latitude and longitude coordinates) to each image captured by a camera, and this process is referred to as geo-tagging.

In the meantime, there is a restriction in allocating sufficient space for a UI without compromising the mobility and the portability of a mobile terminal even when the mobile terminal is equipped with a full touch screen. Therefore, when a plurality of geo-tagged images are marked on a map, the geo-tagged images may overlap each other due to the limited display size of mobile terminals, and thus, it may be difficult to selectively choose and use one of the geo-tagged images.

SUMMARY OF THE INVENTION

The present invention provides a mobile terminal capable of allowing a user to easily select any one of a plurality of pieces of geo-tagged information even from a limited-size screen and a method of controlling the operation of the mobile terminal.

According to an aspect of the present invention, there is provided a method of controlling the operation of a mobile terminal, the method including displaying a map, which is divided into a plurality of blocks in predetermined units of latitude and latitude, on a display module and displaying in each of the blocks identification information indicating whether a corresponding block includes geo-tagged information; and if one of the blocks is selected, displaying one or more thumbnail images corresponding to geo-tagged information included in the selected block on the display module.

According to another aspect of the present invention, there is provided a mobile terminal including a display module configured to display a map, which is divided into a plurality of blocks in predetermined units of latitude and latitude; and a controller configured to display in each of the blocks identification information indicating whether a corresponding block includes geo-tagged information, wherein, if one of the blocks is selected, the controller displays one or more thumbnail images corresponding to geo-tagged information included in the selected block on the display module.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
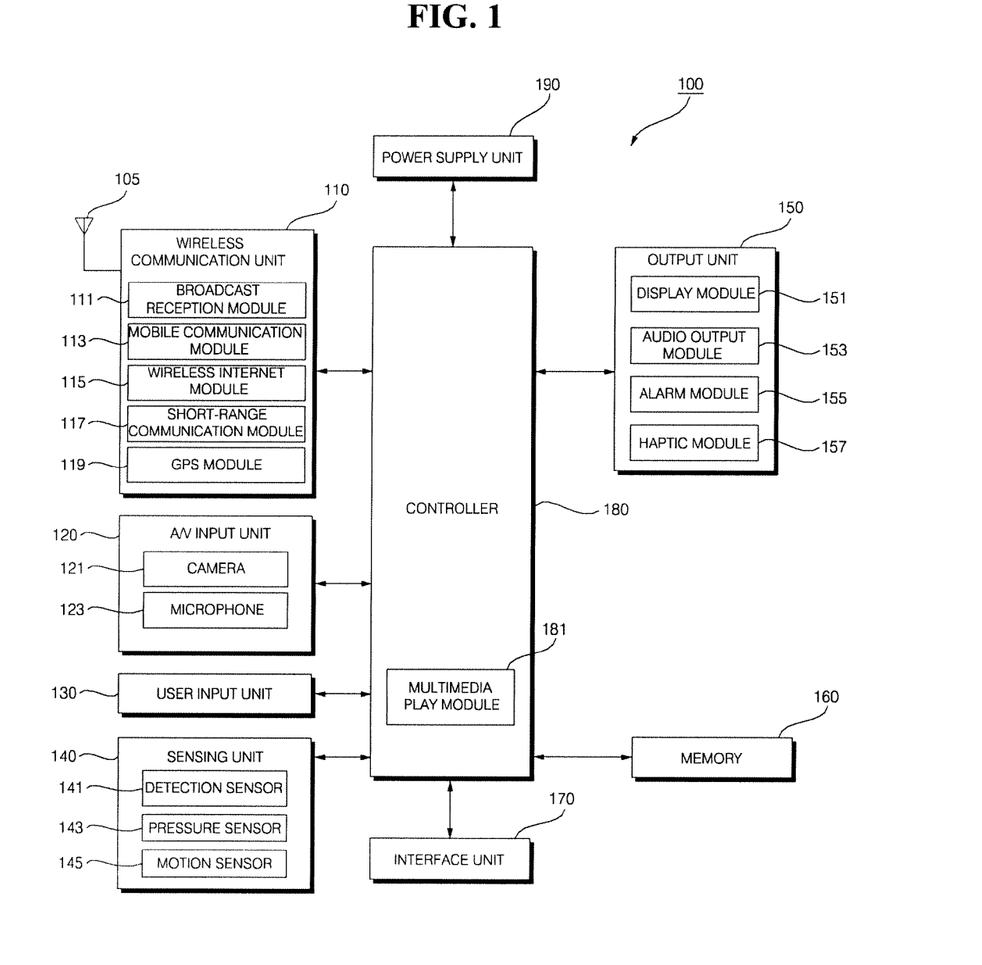
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive at least one of a broadcast signal and broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms.

The broadcast reception module 111 may receive the broadcast signal using various broadcasting systems. In addition, the broadcast reception module 111 may be configured to be suitable for nearly all types of broadcasting systems other than those set forth herein. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may receive a command or information by being pushed or touched by the user. The user input unit 130 may be implemented as a keypad, a dome switch, a static pressure or capacitive touch pad, a jog wheel, a jog switch, joystick, or a finger mouse. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module

151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used not only as an output device but also as an input device capable of receiving information in response to a touch input made by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

Figure 2:
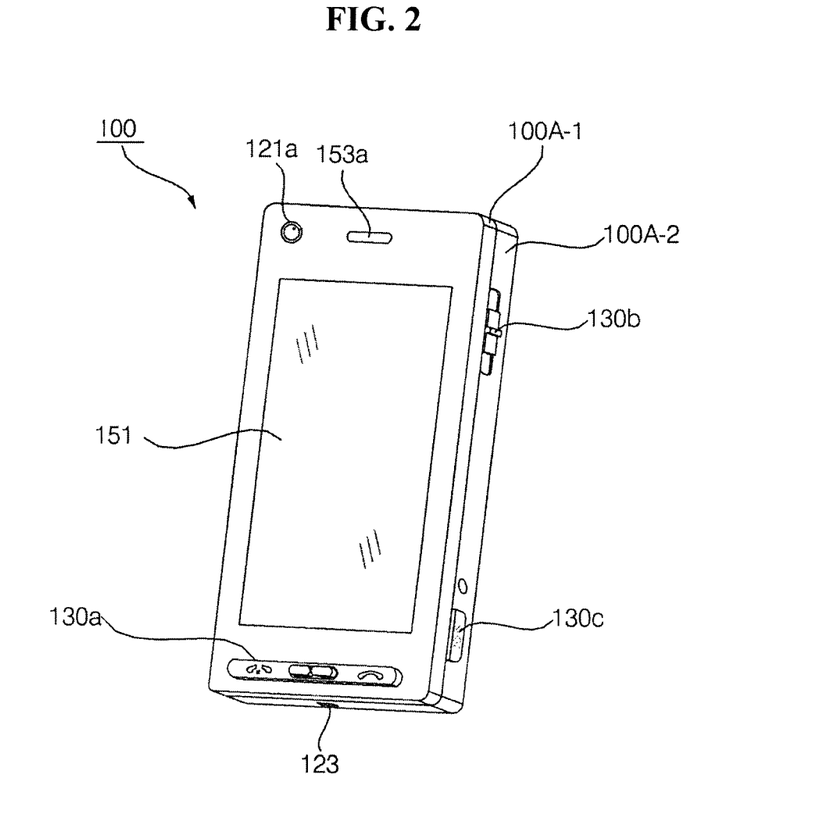
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100A-1 and a rear case 100A-2. Various electronic parts may be installed in the space formed by the front case 100A-1 and the rear case 100A-2. One or more middle cases (not shown) may be additionally provided between the front case 100A-1 and the rear case 100A-2. The front case 100A-1, the rear case 100A-2 and the middle cases may be formed of synthetic resin through molding or may be formed of wood or a metallic material such as stainless steel (STS) or titanium (Ti).

The display module 151, a first audio output module 153a, a first camera 121a, and a first user input module 130a may be provided in the front case 100A-1. A second user input module 130b, a third user input module 130c and the microphone 123 may be provided on one side of the rear case 100A-2.

The display module 151 may include a liquid crystal display (LCD) or an organic light-emitting diode (OLED) which can visualize information. Since a touch pad is configured to overlap the display module 151 and thus to form a layer structure, the display module 151 may serve as a touch screen. Thus, it is possible for the user to enter various information to the mobile terminal 100 simply by touching the display module 151.

The first audio output module 153a may be implemented as a receiver or a speaker. The first camera 121a may be configured to be able to capture a still or moving image of, for example, the user. The microphone 123 may be configured to be able to receive the voice of the user or other sounds.

The first through third user input modules 130a through 130c may be collectively referred to as the user input unit 130. The user input unit 130 may adopt various manipulation methods as long as it can offer tactile feedback to the user. For example, the user input unit 130 may be implemented as a dome switch or touch pad capable of being pushed or touched by the user so as to receive a command or information or as a jog wheel, a jog switch or a joystick capable of being rotated by the user. The first user input module 130a may be used to enter various commands such as 'start', 'end', and 'scroll,' the second user input module 130b may be used to select an operating mode, and the third user input module 130c may serve as a hot key for activating a certain function of the mobile terminal 100.

Figure 3:
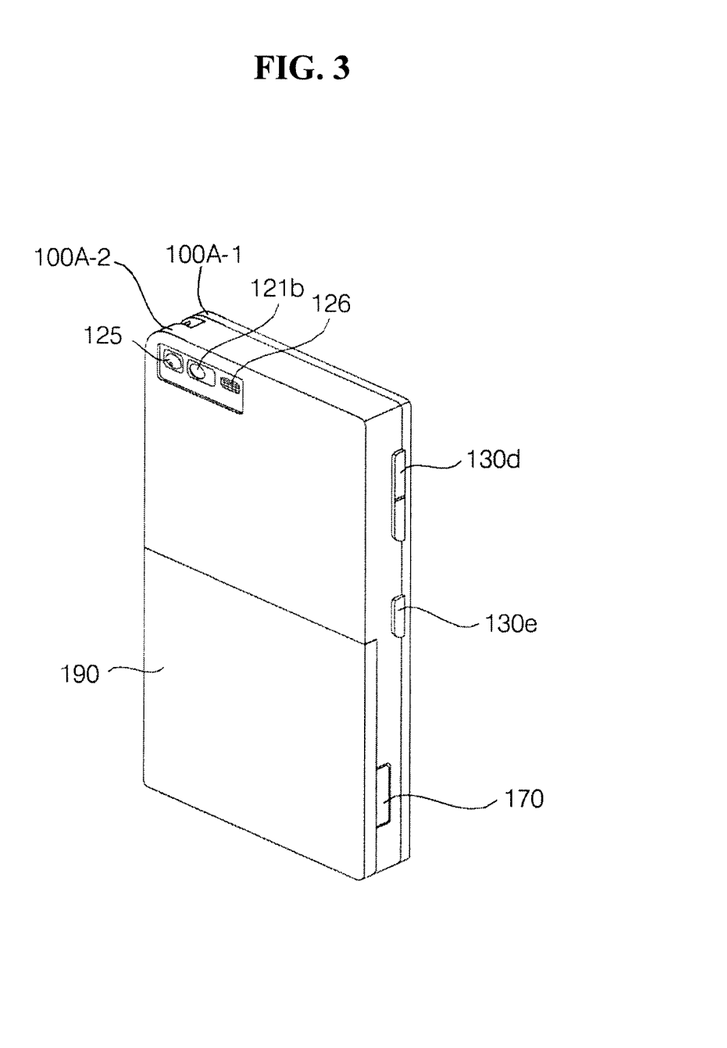
FIG. 3 illustrates a rear perspective view of the mobile terminal shown in FIG. 2.

FIG. 3 illustrates a rear perspective view of the mobile terminal 100. Referring to FIG. 3, a fourth user input module 130d, a fifth user input module 130e, and the interface unit 170 may be provided on one side of the rear case 100A-2, and a second camera 121b may be provided at the bottom of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a camera flash 126 may be disposed near the second camera 121b. The camera flash 126 may be used to illuminate a subject when the user attempts to capture an image of the subject with the second camera 121b. The mirror 125 may be used for the user to prepare him- or herself for taking a self shot.

A second audio output module (not shown) may be additionally provided in the rear case 100A-2. The second audio output module may realize a stereo function along with the first audio output module 153a. The second audio output module may also be used in a speaker-phone mode.

An antenna for receiving a broadcast signal may be additionally provided on one side of the rear case 100A-2. The antenna may be installed so as to be able to be pulled out of the rear case 100A-2.

The power supply unit 190 may be disposed in the rear case 100A-2. The power supply unit 190 may be a rechargeable battery and may be coupled to the rear case 100A-2 so as to be attachable to or detachable from the rear case 100A-2.

The second camera 121b and other elements that have been described as being provided in the rear case 100A-2 may be provided elsewhere, for example, in the front case 100A-1. The first camera 121a may be configured to be rotatable and thus to cover the viewing direction of the second camera 121b. In this case, the second camera 121b may be optional.

Figure 4A:
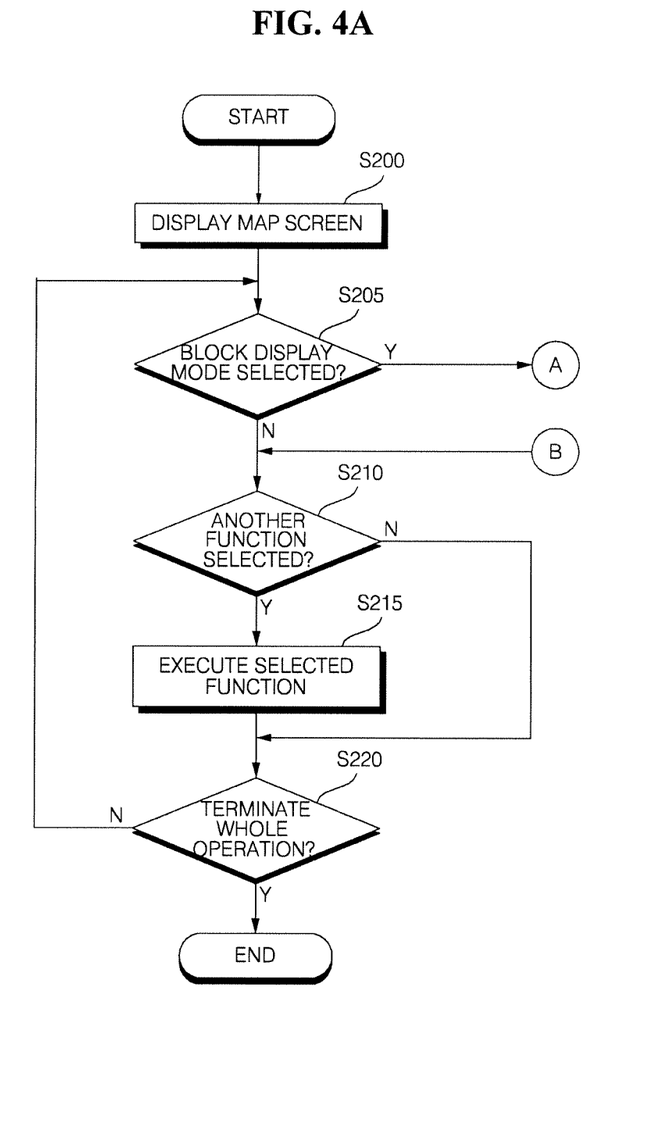
FIGS. 4A and 4B illustrate flowcharts of a method of controlling the operation of a mobile terminal according to an exemplary embodiment of the present invention.
Figure 4B:
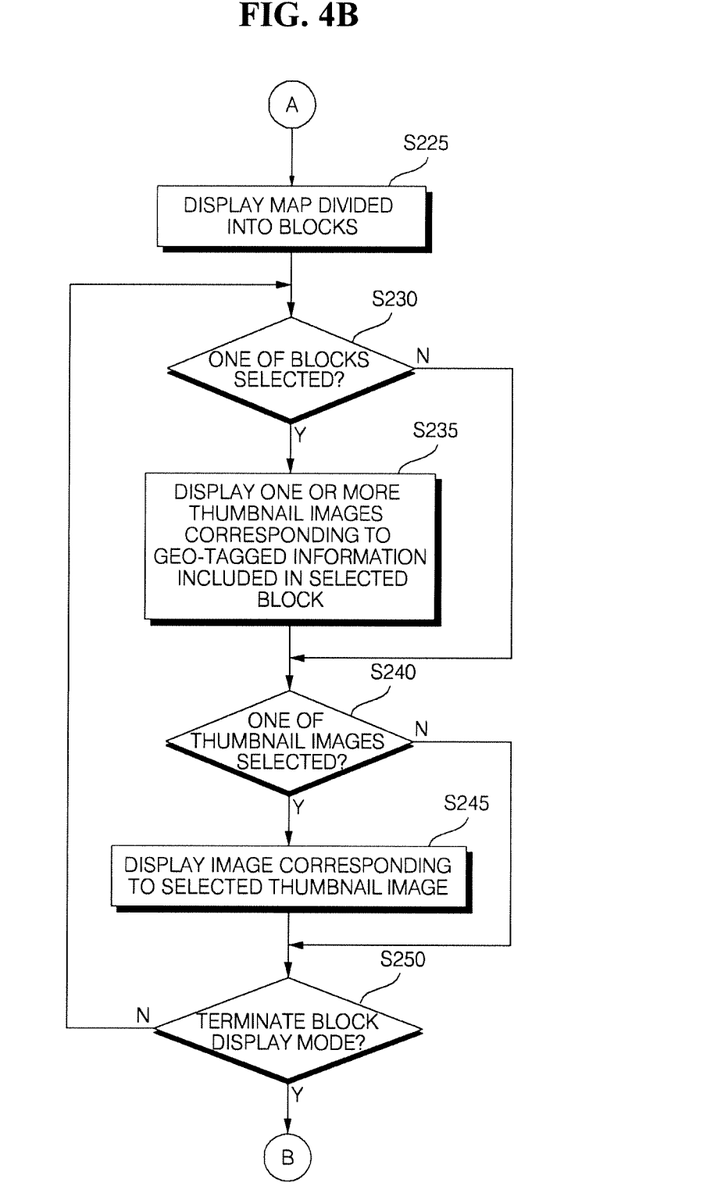

FIGS. 4A and 4B illustrate flowcharts of a method of controlling the operation of a mobile terminal according to an exemplary embodiment of the present invention. Referring to FIG. 4A, the controller 180 may display a map screen on the display module 151 in response to a user command (S200). A plurality of pieces of geo-tagged information such as geo-tagged images may be marked on the map screen, and thus, the user may easily search for images captured at a certain location or images of the certain location.

Thereafter, if a block display mode is selected (S205), the method proceeds to operation S225.

The plurality of pieces of geo-tagged information may be marked on the map screen with flags or speech balloons. If one of the flags or speech balloons is selected by being touched, an image corresponding to the selected flag or speech balloon may be displayed on the display module 151. Due to the limited size of the display module 151, more than one piece of geo-tagged information may be stacked over the same position on the map screen. If a stack of a plurality of pieces of geo-tagged information is touched, the geo-tagged information on the top of the stack may be configured to be selected. In this case, it is necessary to switch to the block display mode and display the map screen in the block display mode.

If another map screen-related function other than switching to the block display mode is selected (S210), the controller 180 may control the selected function to be executed (S215). Operations S205 through S215 may be repeatedly performed until the user chooses to terminate the whole map screen-related menu (S220).

Referring to FIG. 4B, if the block display mode is selected (S205), the controller 180 may display a map screen showing a map which is divided into a plurality of blocks in predetermined units of latitude and latitude (S225). Each of the blocks may show identification information indicating whether a corresponding block includes geo-tagged information and how many pieces of geo-tagged information there are in the corresponding block. The identification information may be a numeric value representing the number of pieces of geo-tagged information marked in each of the blocks.

If a block includes geo-tagged information, the geo-tagged information may be displayed in the block. More specifically, if the block includes a plurality of geo-tagged images, a most-recently geo-tagged image may be displayed in the block. Alternatively, the plurality of geo-tagged images may be displayed one after another in the block at regular intervals of time.

Therefore, the user may easily identify, from identification information or an image displayed in each of the blocks, whether each of the blocks includes geo-tagged information and how many pieces of geo-tagged information there are in each of the blocks.

If one of the blocks is selected in response to, for example, a touch input (S230), the controller 180 may display a thumbnail viewer screen showing thumbnails of pieces of geo-tagged information marked in the selected block on the display module 151 (S235). If the selected block does not include any geo-tagged information, a message indicating that there is no geo-tagged information in the selected block may be displayed on the display module 151.

If one of the thumbnail images displayed on the thumbnail viewer screen is selected (S240), the controller 180 may display an image corresponding to the selected thumbnail image on the entire display module 151 (S245). The controller 180 may also display a number of menu icons for executing such functions as sending an image or changing settings on the display module 151.

If the user chooses to terminate the block display mode (S260), the method returns to operation S210. Otherwise, the method returns to operation S230.

In this manner, it is possible to easily select one of a plurality of pieces of geo-tagged information even from a limited-size screen.

The method shown in FIGS. 4A and 4B will hereinafter be described in further detail with reference to FIGS. 5 through 10.

Figure 5:
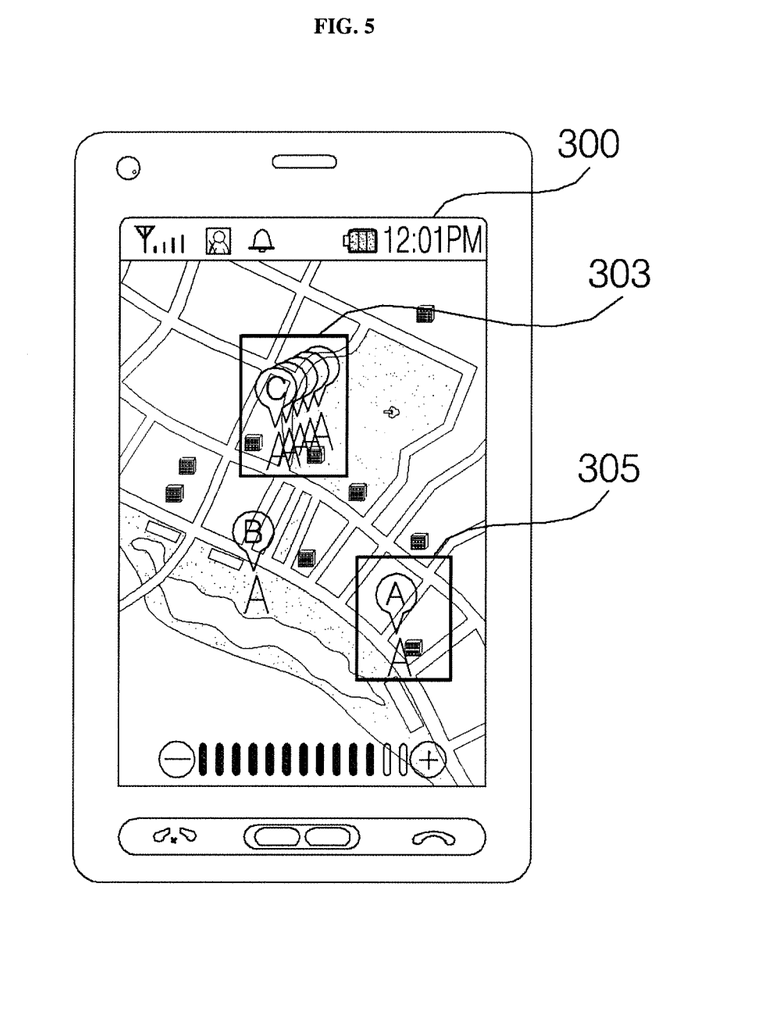
FIG. 5 illustrates an example of a map screen showing a map of geo-tagged information.

Referring to FIG. 5, a map screen 300 showing a map of a plurality of pieces of geo-tagged information (e.g., a plurality of geo-tagged images) may be displayed on the display module. The plurality of geo-tagged images may be marked on the map screen 300 with flags or speech balloons. If one of the flags or speech balloons is selected, geo-tagged image (e.g., a geo-tagged image) corresponding to the selected flag or speech balloon and detailed information of the geo-tagged image may be displayed.

In parts 303 and 305 of the map screen 300, more than one speech balloon is stacked over each other, and is thus difficult to select individually. In this case, the block display mode may be required.

Figure 6:
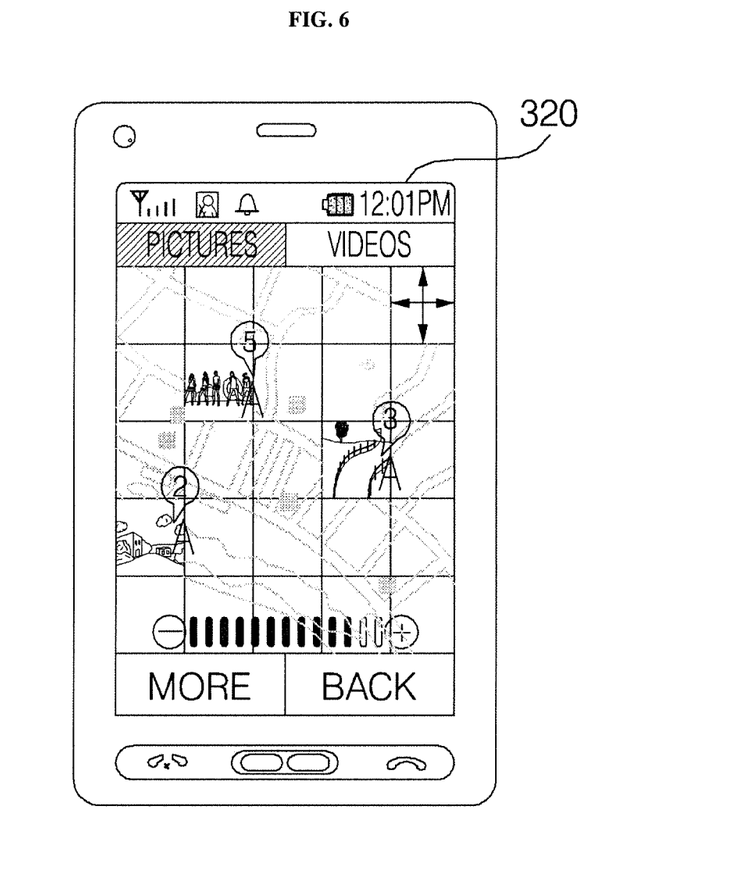
FIG. 6 illustrates an example of a map screen that can be displayed during a block display mode.

Referring to FIG. 6, during the block display mode, a map screen 320 may be displayed on the display module 151. The map screen 320 shows a map of a plurality of geo-tagged images, and the map may be divided into a plurality of blocks in predetermined units of latitude and latitude. In each block including at least one geo-tagged image, a speech balloon specifying the number of geo-tagged images included in a corresponding block and one of the geo-tagged images included in the corresponding block may be displayed. Therefore, it is possible to easily identify from the map screen 320 which of the blocks includes geo-tagged images and/or how many geo-tagged images there are in each of the blocks.

Figure 7:
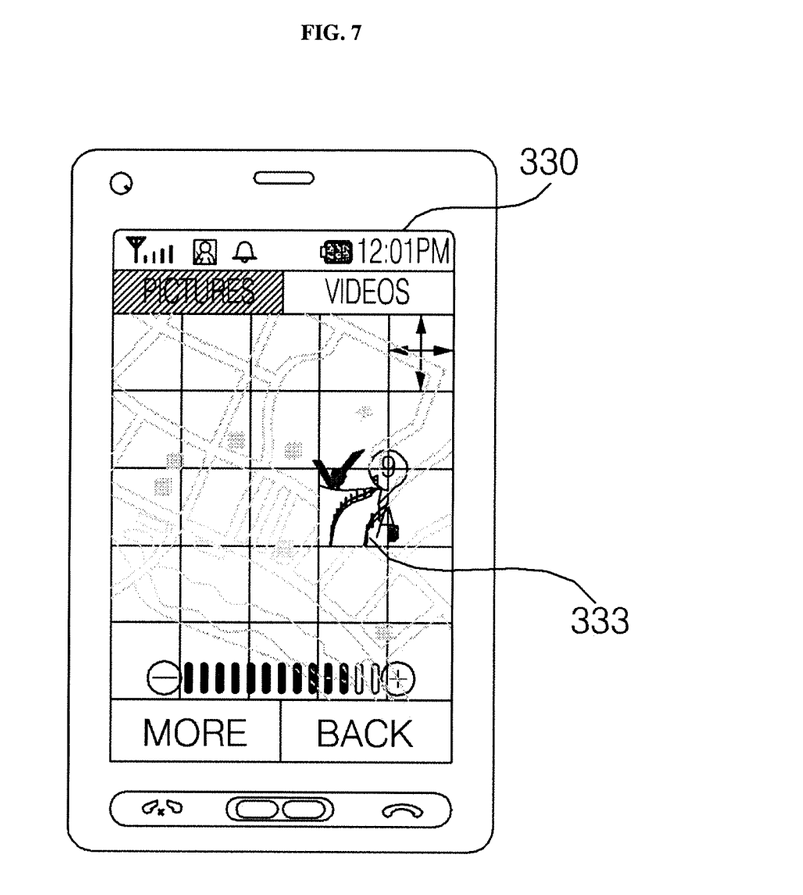
FIG. 7 illustrates a map screen for explaining how to select a block therefrom.

Referring to FIG. 7, a block 333, which includes a plurality of geo-tagged images, may be selected from a map screen 330. In order to facilitate the selection of the block 333 from the map screen 330, the map screen 330 may be zoomed in or out in response to a user command.

Figure 8:
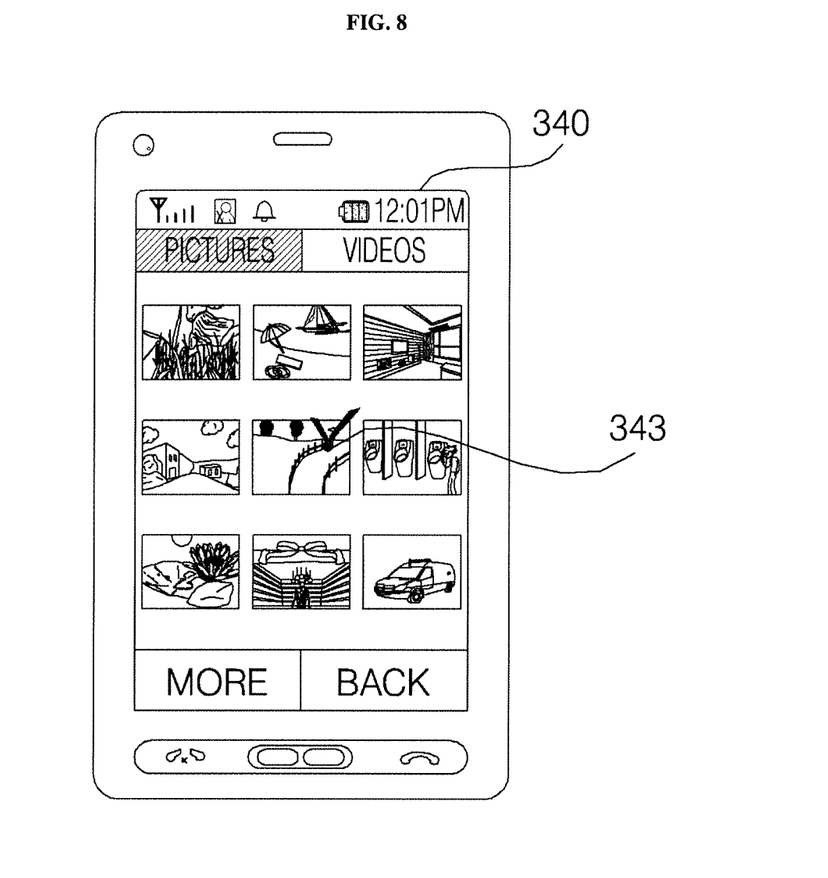
FIG. 8 illustrates a screen showing a plurality of thumbnail images respectively corresponding to a plurality of geo-tagged images marked in a block touched by a user.

Referring to FIG. 8, as a result of the selection of the block 333 shown in FIG. 7, a map screen 340 showing a plurality of thumbnail images respectively corresponding to the plurality of geo-tagged images included in the block 333 may be displayed on the display module 151. If there are too many thumbnail images to display all at once, the map screen 340 may be configured to be scrollable.

Figure 9:
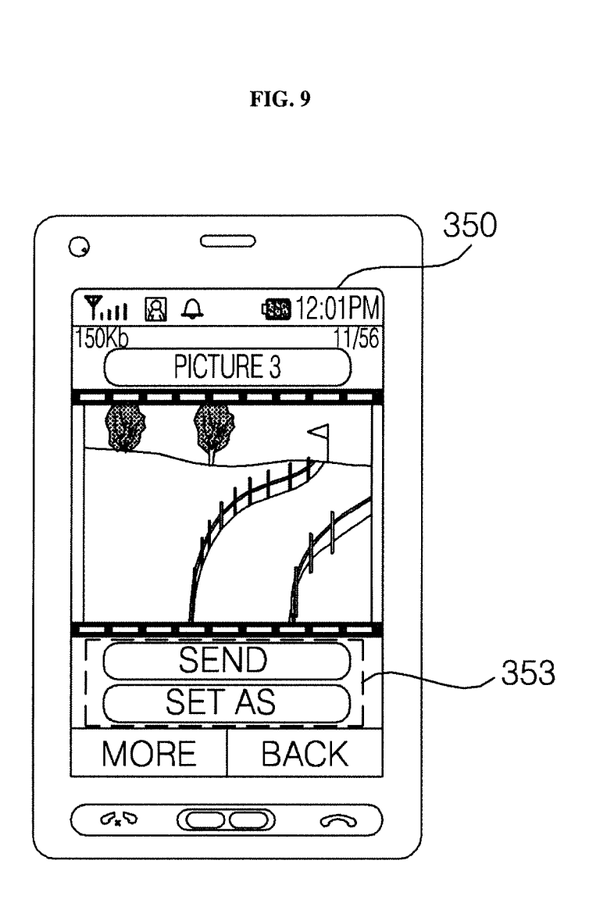
FIG. 9 illustrates a screen showing an enlarged view of a thumbnail image selected from the thumbnail images shown in FIG. 8.
Figure 10:
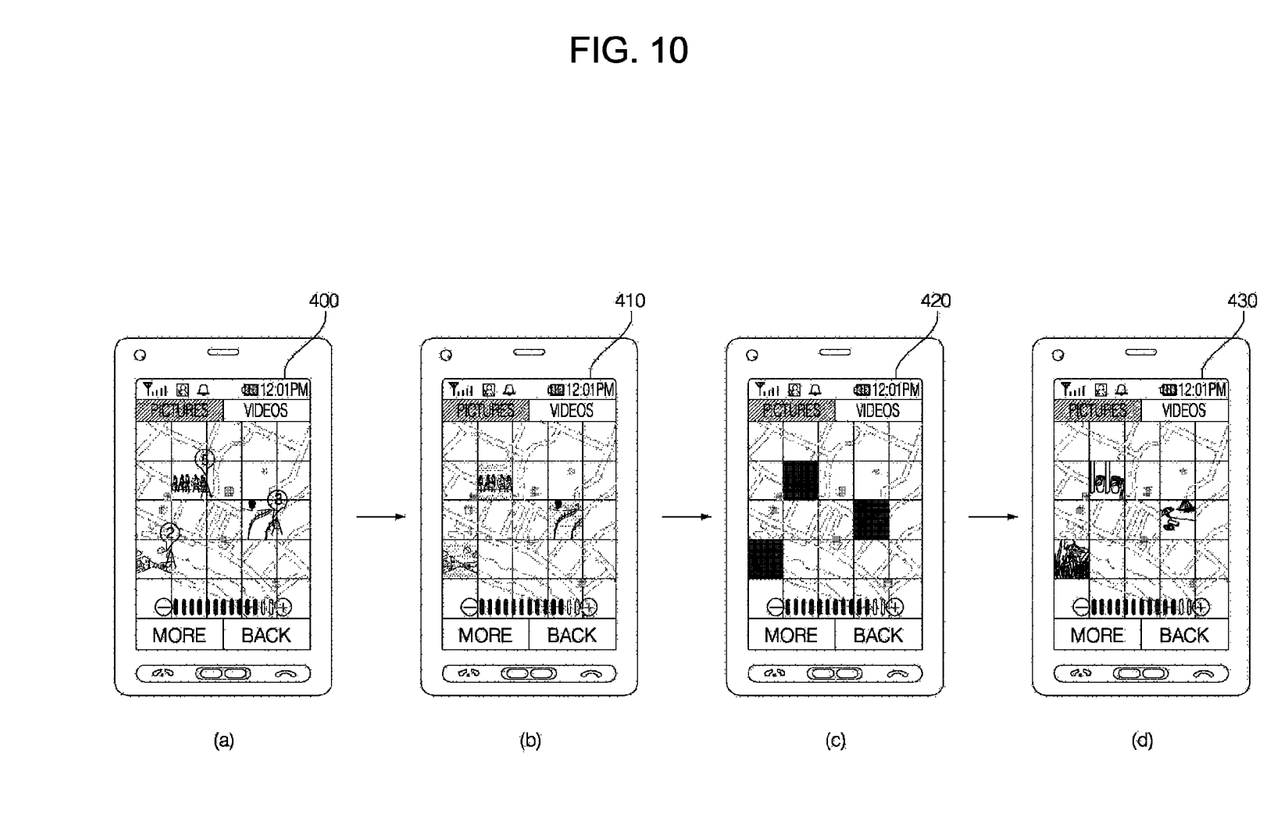
FIGS. 10(a) through 10(d) illustrate diagrams for explaining how to sequentially display a plurality of geo-tagged images marked in a block.

If one of the thumbnail images on the map screen 340, for example, a thumbnail image 343, is selected in response to a touch input, an image viewer screen 350 showing an image corresponding to the selected thumbnail image 343 may be displayed on the display module 151, as shown in FIG. 9. Referring to FIG. 9, the image viewer screen 350 may provide one or more menu icons 353 for sending an image and changing settings. If the image corresponding to the selected thumbnail image 343 is touched and then dragged, an image corresponding to another thumbnail image may be displayed on the image viewer screen 350.

Referring to FIG. 10(a), if the block display mode is selected, a map screen 400 showing a map of a plurality of geo-tagged images may be displayed. The map of the plurality of geo-tagged images may be divided into a plurality of blocks in predetermined units of latitude and latitude, may be displayed, and each of the blocks may display numeric information specifying the number of geo-tagged images included therein, and one of the geo-tagged images included therein.

A predefined amount of time after the display of the map screen 400, the map screen 400 may be replaced with a map screen 410 where the numeric information specifying the number of geo-tagged images included in each of the blocks is no longer displayed, as shown in FIG. 10(b).

A predefined amount of time after the display of the map screen 410, the map screen 410 may be replaced with a map screen 420 where the geo-tagged images displayed on the map screen 410 are no longer displayed, as shown in FIG. 10(c). A predefined amount of time after the display of the map screen 420, the map screen 420 may be replaced with a map screen 430, as shown in FIG. 10(d). Referring to the map screen 430, the geo-tagged images displayed on the map screen 410 may be replaced with other geo-tagged images.

In this manner, it is possible to sequentially display a number of geo-tagged images included in each block of a map screen.

a. The mobile terminal according to the present invention and the method of controlling the operation of a mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, a map of geo-tagged information may be displayed on a map screen and may be divided into a plurality of blocks in predetermined units of latitude and latitude. Each of the blocks may show identification information indicating whether a corresponding block includes geo-tagged information. Then, if one of the blocks is selected, one or more thumbnail images corresponding to geo-tagged information included in the selected block may be displayed. Therefore, it is possible to effectively select and use geo-tagged information even when using a small size screen.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display method for a mobile terminal, the method comprising:
    displaying a map on a display of the mobile terminal;
    displaying a graphical symbol on the map indicating that a corresponding area of the map is associated with geo-tagged images;
    displaying identification information corresponding to the graphical symbol, the identification information specifying a number of the geo-tagged images that are associated with the corresponding area of the map;
    displaying a first image on the map at a location that is proximate to the graphical symbol and the identification information, wherein the first image is one of the geo-tagged images, and wherein the first image is different from the graphical symbol;
    displaying a list of images responsive to receiving a first user selection, wherein the images of the list are included in the geo-tagged images;
    terminating the displaying of the map, the displaying of the graphical symbol, and the displaying of the identification information;
    terminating the displaying of the first image on the map at the location after receiving the first user selection;
    displaying a selected image of the list of images responsive to receiving a second user selection;
    maintaining the displaying of the list of images until the second user selection is received;
    displaying a menu comprising user selectable items, wherein each of the user selectable items relate to an action that can be performed with regard to the selected image.

2. The method of claim 1, further comprising:
    changing the displayed first image after a threshold time period such that the displayed first image is changed so that another image of the geo-tagged images is displayed on the map at the location that is proximate to the graphical symbol and the identification information; and
    repeating the changing so that multiple images, which correspond to multiple images of the geo-tagged images, are sequentially displayed.

3. The method of claim 1, further comprising:
    displaying a plurality of graphical symbols on the map each of which respectively indicate that a corresponding area of the map is associated with geo-tagged images; and
    displaying identification information for each of the plurality of graphical symbols, wherein the identification information of each of the plurality of graphical symbols specifies a number of geo-tagged images that are associated with the corresponding area of the map.

4. The method of claim 3, further comprising:
    changing the number of the displayed plurality of graphical symbols to reflect a displayed area of the map, such that increasing the displayed area of the map results in a decrease in the number of the displayed plurality of graphical symbols, and decreasing the displayed area of the map results in an increase in the number of the displayed plurality of graphical symbols; and maintaining a collective total of the number of the items of the geo-tagged images of all of the displayed plurality of graphical symbols regardless of the changing.

5. The method of claim 3, further comprising:
    changing the number of the displayed plurality of graphical symbols to reflect a displayed area of the map, such that increasing the displayed area of the map results in a decrease in the number of the displayed plurality of graphical symbols, and decreasing the displayed area of the map results in an increase in the number of the displayed plurality of graphical symbols.

6. The method of claim 1, wherein other images that are respectively associated with other items of the geo-tagged images are not displayed on the map while the first image is displayed.

7. The method of claim 1, wherein one action of the user selectable items comprises sending the selected image.

8. The method of claim 1, further comprising:
    displaying a plurality of graphical symbols on the map each of which respectively indicates that a corresponding area includes geo-tagged images;
    displaying identification information for each of the plurality of graphical symbols, wherein the identification information of each of the plurality of graphical symbols specifies a number of images of the geo-tagged images that are associated with the corresponding area of the map; and displaying a plurality of first images on the map at locations that are each respectively proximate to one of the plurality of graphical symbols and associated identification information, wherein each of the plurality of the first images is one of the items of the geo-tagged images of an the associated one of the plurality of graphical symbols.

9. The method of claim 8, further comprising:
displaying a portion of the map in a relatively larger scale responsive to receiving a first user input;
displaying a portion of the map in a relatively smaller scale responsive to receiving a second user input; and
changing the number of the displayed plurality of graphical symbols to reflect map scale, such that when the portion of the map is displayed in the relatively larger scale there is a relative decrease in the number of the displayed plurality of graphical symbols, and when the portion of the map is displayed in the relatively smaller scale there is a relative increase in the number of the displayed plurality of graphical symbols.

10. The method of claim 1, wherein the selected image encompasses a relatively greater area than when the selected image is displayed as part of the list of images.

11. A mobile terminal, comprising:
a display;
a communication unit configured to communicate with a network; and
a controller configured to cooperate with the display and the communication unit to:
cause the display to display a map;
cause the display to display a graphical symbol on the map indicating that a corresponding area of the map is associated with geo-tagged images;
cause the display to display identification information corresponding to the graphical symbol, the identification information specifying a number of the geo-tagged images that are associated with the corresponding area of the map;
cause the display to display a first image on the map at a location that is proximate to the graphical symbol and the identification information, wherein the first image is one of the geo-tagged images, and wherein the first image is different from the graphical symbol;
cause the display to display a list of images responsive to receiving a first user selection, wherein the images of the list are included in the geo-tagged images;
terminate the displaying of the map, the displaying of the graphical symbol, and the displaying of the identification information;
terminate the displaying of the first image on the map at the location after receiving the first user selection
cause the display to display a selected image of the list of images responsive to receiving a second user selection;
maintain the displaying of the list of images until the second user selection is received; and
cause the display to display a menu comprising user selectable items, wherein each of the user selectable items relate to an action that can be performed with regard to the selected image.

12. The mobile terminal of claim 11, wherein the controller is further configured to:
cause the display to change the displayed first image after a threshold time period such that the displayed first image is changed so that another image of the geo-tagged images is displayed on the map at the location that is proximate to the graphical symbol and the identification information; and
cause the display to repeat the changing so that multiple images, which correspond to multiple images of the geo-tagged images, are sequentially displayed.

13. The mobile terminal of claim 11, wherein the controller is further configured to:
cause the display to display a plurality of graphical symbols on the map each of which respectively indicate that a corresponding area of the map is associated with geo-tagged images; and
cause the display to display identification information for each of the plurality of graphical symbols, wherein the identification information of each of the plurality of graphical symbols specifies a number of geo-tagged images that are associated with the corresponding area of the map.

14. The mobile terminal of claim 13, wherein the controller is further configured to:
cause the display to change the number of the displayed plurality of graphical symbols to reflect a displayed area of the map, such that increasing the displayed area of the map results in a decrease in the number of the displayed plurality of graphical symbols, and decreasing the displayed area of the map results in an increase in the number of the displayed plurality of graphical symbols; and
maintain a collective total of the number of the items of the geo-tagged images of all of the displayed plurality of graphical symbols regardless of the changing.

15. The mobile terminal of claim 13, wherein the controller is further configured to:
cause the display to change the number of the displayed plurality of graphical symbols to reflect a displayed area of the map, such that increasing the displayed area of the map results in a decrease in the number of the displayed plurality of graphical symbols, and decreasing the displayed area of the map results in an increase in the number of the displayed plurality of graphical symbols.

16. The mobile terminal of claim 11, wherein other images that are respectively associated with other items of the geo-tagged images are not displayed on the map while the first image is displayed.

17. The mobile terminal of claim 11, wherein the controller is further configured to:
cause the display to display a plurality of graphical symbols on the map each of which respectively indicates that a corresponding area includes geo-tagged images;
cause the display to display identification information for each of the plurality of graphical symbols, wherein the identification information of each of the plurality of graphical symbols specifies a number of images of the geo-tagged images that are associated with the corresponding area of the map; and
cause the display to display a plurality of first images on the map at locations that are each respectively proximate to one of the plurality of graphical symbols and associated identification information, wherein each of the plurality of the first images is one of the items of the geo-tagged images of an the associated one of the plurality of graphical symbols.

18. The mobile terminal of claim 17, wherein the controller is further configured to:
cause the display to display a portion of the map in a relatively larger scale responsive to receiving a first user input;

cause the display to display a portion of the map in a relatively smaller scale responsive to receiving a second user input; and cause the display to change the number of the displayed plurality of graphical symbols to reflect map scale, such that when the portion of the map is displayed in the relatively larger scale there is a relative decrease in the number of the displayed plurality of graphical symbols, and when the portion of the map is displayed in the relatively smaller scale there is a relative increase in the number of the displayed plurality of graphical symbols.

* * * * *